Patented July 25, 1950

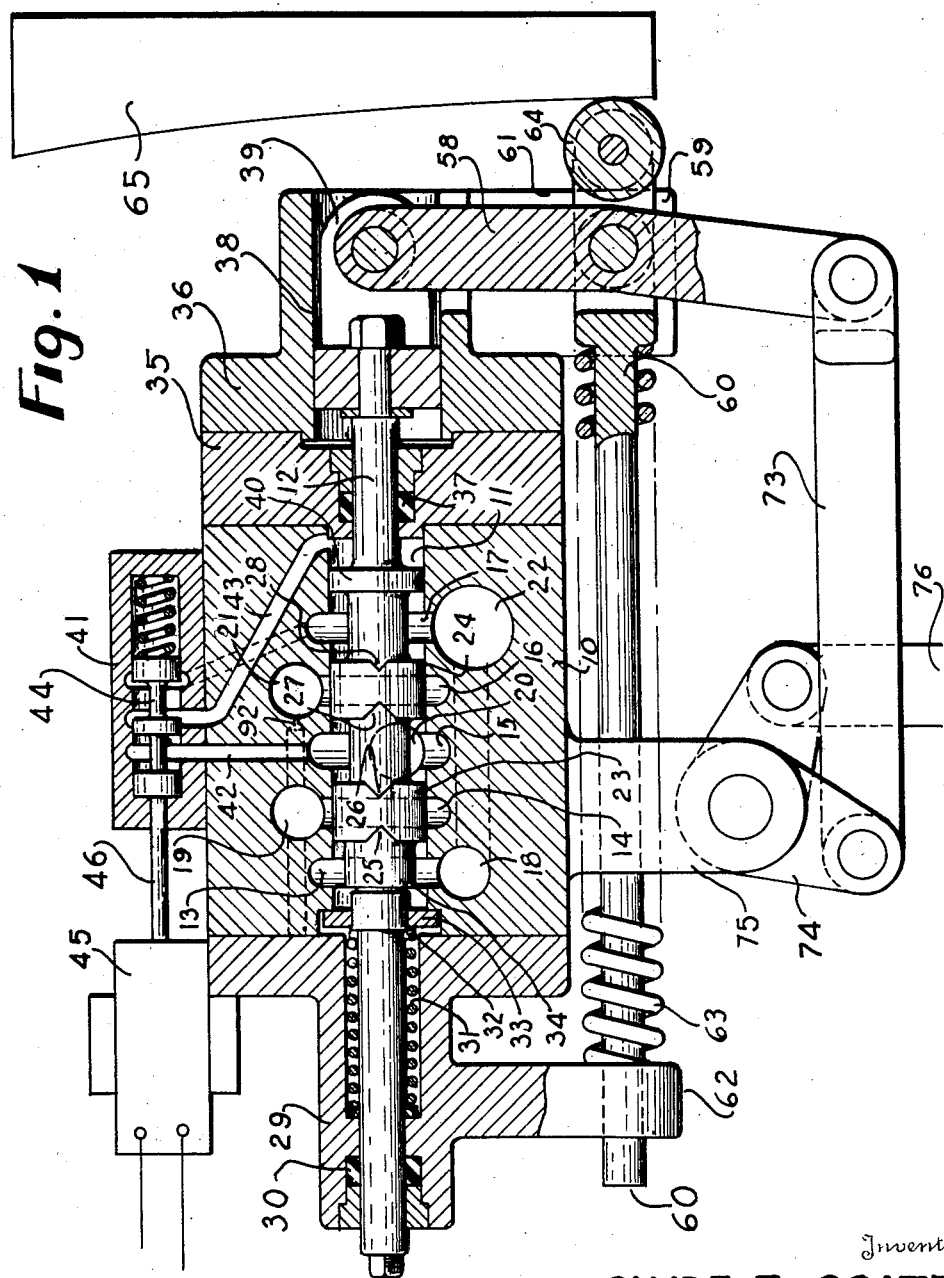

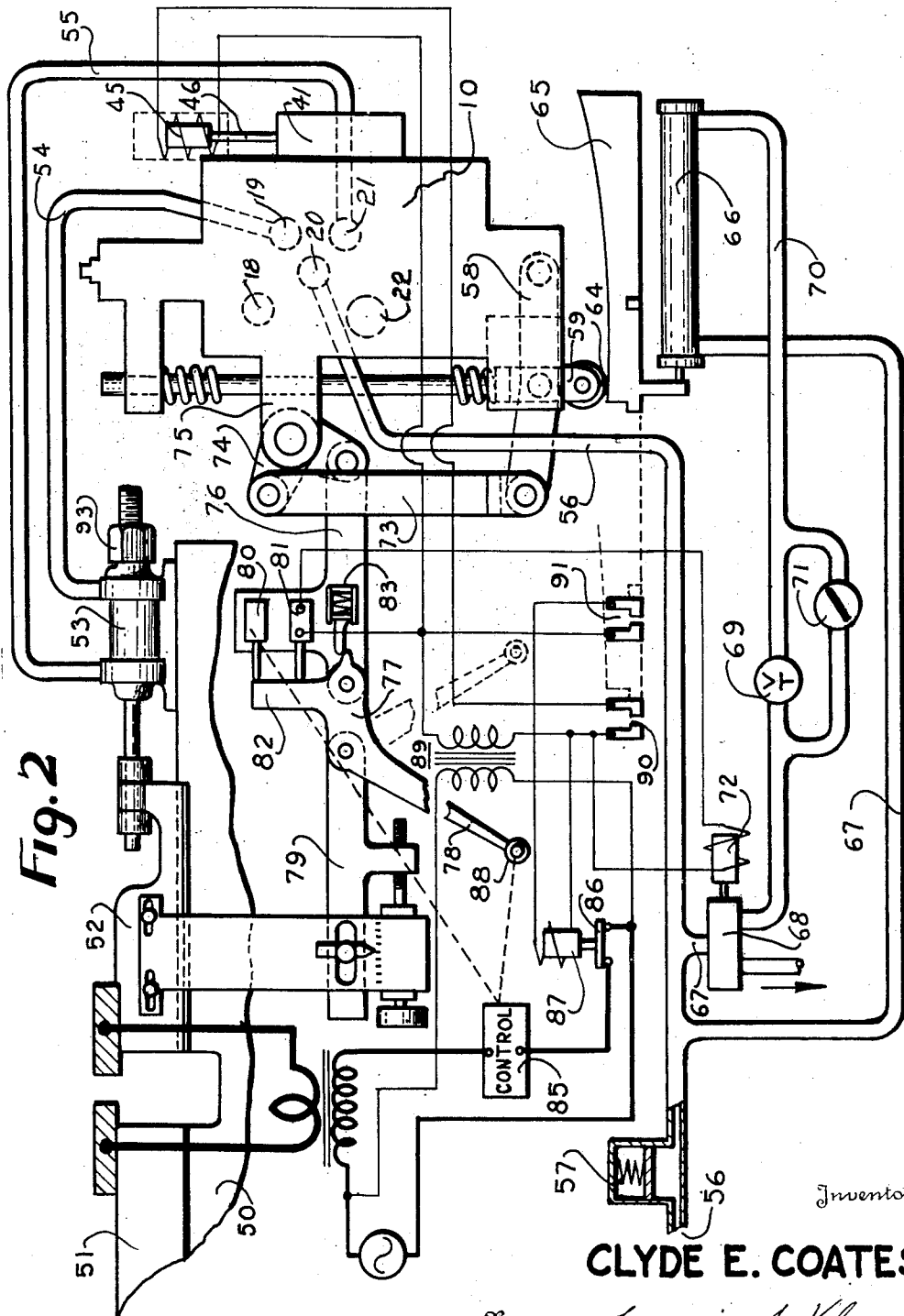

2,516,449

UNITED STATES PATENT OFFICE 2,516,449

MOVEMENT CONTROLLING VALVE MEANS FOR FOLLOW-UP PRESSURE FLUID SERVOMOTORS AND THE LIKE

Clyde E. Coates, Warren, Ohio, assignor to The Taylor-Winfield Corporation, Warren, Ohio, a corporation of Ohio Application September 15, 1944, Serial No. 554,220

4 Claims. (Cl. 121—41)

This invention relates to hydraulic valve arrangements and more particularly to an improved valve and actuating mechanism therefor which is operative to effect precise control over the movement of a hydraulically actuated member such as, for example, the slideable platen of a flash-butt electric resistance welding machine. While the invention is concerned primarily with a hydraulic valve of the follow-up type having special utility in connection with hydraulically actuated flash-butt welders as will be specifically described hereinbelow in connection with such special application, it should become apparent as the description proceeds that the broader and majority of the features involved are similarly applicable in a beneficial manner to a wide variety of hydraulically actuated devices.

The primary object of the invention is the simplification of the control apparatus required to effect precision control of and wide flexibility in the movement of a hydraulically actuated machine element. Thus, it is within the province of the present invention to provide a simplified but improved valve arrangement for controlling the flow of hydraulic fluid pressure to a fluid pressure operated motor in such manner that the driving element of the motor may be caused to move precisely in accordance with the movement of a mechanically operated reference member, a manually moved reference member, or in accordance with the movement of an element or member as results from combined predetermined or mechanical and manual effort.

Another object of the invention is the provision of a substantially simplified but improved arrangement for valving the flow of hydraulic fluid to a fluid pressure operated motor having a normal operating stroke only during a portion of which is precision controlled over the character of movement of the driving element required, after which a large volume of fluid is required to effect a rapid acceleration of the driving element. I have heretofore proposed, as disclosed and claimed in copending application Serial No. 431,364, filed February 18, 1942, now U. S. Patent No. 2,373,226, to accomplish these combined objectives by providing a smaller precision follow-up valve for controlling the operation of the motor during the first part of its stroke and an additional dumping valve for quickly furnishing a large volume of fluid from a suitable source, as an accumulator, at the time rapid acceleration of the motor is desired. The present invention is an improvement over the system described and illustrated in my prior application in that the present system requires but a single valve for accomplishing both stated functions and in that additional improvement in the smoothness and precision of the movement of the driven slide is attained. Moreover, the present single valve means may be produced more economically than the follow-up valves heretofore employed for comparable purposes. A further object of the invention is the provision of an improved follow-up valve for metering the flow of hydraulic fluid to a fluid pressure operated motor, notably of the cylinder and piston type, which is operative to effect smoother movements of the driving elements of the motor in response to demands of the follow-up valve. This object is accomplished in accordance with the present invention, in a motor of the cylinder and piston type at least, by so diminishing the ports of the valve that an appreciable hydraulic fluid back pressure is always maintained on the "back" side of the piston thereby positively preventing any chattering or jerking in the movement of the piston.

Yet another object of the invention is the provision of simplified and improved linkage for coupling both the machine element being moved and a movement controlling element with the movable valve element of a follow-up valve utilized to control the flow of hydraulic fluid to the motor utilized in effecting movement of the machine element.

The above and other specific objects and advantages of the invention will become apparent upon consideration of the following detailed specification and the accompanying drawing wherein there is disclosed a preferred embodiment of the invention.

In the drawing:

Figure 1 is a longitudinal sectional view of a hydraulic follow-up valve constructed in accordance with the principles of the invention; and Figure 2 is a schematic representation of an electric resistance flash-butt welding machine utilizing the valve and the linkage means shown more in detail in Figure 1.

The principal valve of the invention consists of a valve body 10 having a centrally disposed bore 11 in which is slideably mounted a spool indicated generally by the numeral 12. Formed in the side wall of the bore 11 are the longitudinally spaced annular grooves or recesses 13, 14, 15, 16 and 17, the first of which is in open communication with an exhaust port 18 extending to the outer wall of the body 10 while the recess 14 is in open communication with a port 19 which may be connected to one end of a double acting hydraulic cylinder. The centrally disposed recess 15 is in open communication with a pressure inlet port 20, the recess 16 with a port 21 which may be connected to the opposite end of said cylinder, and the recess 17 with an exhaust port 22. As shown in Figure 1, the spool 12 is provided with a pair of longitudinally spaced diametrically enlarged portions 23 and 24 which, in the neutral position of the spool, span the recesses 14 and 16, respectively. In the end walls of the enlargements 23 and 24 there is formed radially extending V slots or cuts which begin at the base diameter of the spool and extend radially outward to the outer peripheral surface of the enlargements 23 and 24. Thus, in enlargement 23 a groove 25 is formed in the side thereof adjacent the recess 13 while a similar groove 26 is formed in the opposite side thereof. A cut 27, which may be identical in dimension with cuts 25 and 26 is formed in the side of enlargement 24 adjacent the recess 15 while a cut 28 which is preferably slightly shallower than the cut 26 for a reason to be later described, is formed in the opposite side of the enlargement 24.

While the drawing shows but a single cut in each of the end walls of the enlargements 23 and 24 it should be understood that any number of such cuts may be provided in each of the end walls, depending upon the particular use to which the valve is to be put. If multiple cuts are provided in each face the same would preferably be spaced circumferentially. As illustrated, the "bottoms" of the cuts 25 and 26 lie, in the neutral position of the valve, at or very slightly outward of the side edges of the annular recess 14 and, similarly the bottom of the cut 27 is so located with respect to the side edge of the annular recess 16. The bottom of the cut 28 is spaced slightly from the outer side edge of the annular recess 16 and it should be apparent that if the spool 12 is moved to the right, as viewed in Figure 1, fluid will be admitted from inlet port 20 through cut 27 into recess 16 and thus into port 21 and, assuming the ports 21 and 19 to be connected to opposite ends of a cylinder, fluid from the "tail" end of the cylinder will pass through port 19, recess 14, cut 25, recess 13 to exhaust port 18. Since cuts 25 and 27 are identical in dimension and bear identical relation with respect to the contiguous edges of the recess 14 and 16, respectively, the back pressure in the cylinder will not be such as to impede appreciably the movement of the piston in the driven direction so that the piston may move fairly rapidly, depending of course on the degree of opening of the valve. However, upon movement of the spool 12 to the left, as viewed in Figure 1, the slight restriction of the cut 28 with respect to the cut 26 will always provide a differential in fluid metering area in favor of the cut 26 so that while the piston will continue to move in the opposite direction an appreciable back pressure will always be maintained in this cylinder thereby absolutely preventing chattering or jerking movement of the piston in this direction.

Secured to one end of the valve body 10 is an end cap 29 having a bore therethrough for the reception of an end portion of the spool 12, which bore is enlarged adjacent the outer end of the cap to receive packing 30 and adjacent the inner end to receive the coil spring 31 the inner end of which abuts against a washer lying against a shoulder 32 of the spool 12. Bore 11 in body 10 is enlarged to slideably receive a washer 33 which overlies the washer abutted by spring 31 and spool 12 has a second shoulder 34 which engages washer 33 upon the spool being moved far to the left as viewed in Figure 1. Thus the spring 31, in addition, provides a yieldable shock absorbing stop for the spool 12.

An end cap comprising parts 35 and 36 is secured to the opposite end of the valve body 10 and part 35 has its bore enlarged to receive packing 37 while part 36 has a cylindrical guiding surface 38 for slideably receiving a clevis 39 which is connected to the adjacent end of the spool 12. It should be obvious that upon longitudinal sliding movement of the clevis 39 in the guide 38 the spool 12 will have corresponding sliding movement in the bore 11. For a purpose to be later described, additional means is provided to slideably move the spool 12 irrespective of application of force to the clevis 39 and such additional means may consist of a piston 40 formed integral with the spool 12 and slideable in the outer portion of the bore 11 which is adjacent the cap member 35. Means in the form of a three-way valve 41 is provided to admit fluid pressure into the bore 11 intermediate the piston 40 and cap member 35 whenever desired. As shown, valve 41 is preferably attached directly to the valve body 10 and a passageway 42 in the body 10 connects the inlet port recess 15 with the inlet port of the valve 41 and a passageway 43 also provided in the body 10 connects the outlet port of the valve 41 with the space in bore 11 on the outer side of piston 40. The exhaust port of valve 41 is connected with the exhaust port 22 of the principal valve and, in accordance with usual practice, valve 41 has a slideable operating plunger 44 arranged to be operated by a solenoid 45 through a stem 46.

As stated hereinbefore, the described valve mechanism is particularly well suited for controlling the movement of a hydraulically actuated platen in an electric resistance butt-flash welding machine and for completion of the description of the valve mechanism such adaptation of the mechanism will be specifically described. Referring to Figure 2, a butt-flash welding machine having a base 50 having a stationary clamp and electrode carrying platen 51 is provided with a slide clamp and electrode carrying platen 52 arranged to be moved by a double acting hydraulic cylinder 53, the piston of which is connected to the platen 52 as will be understood. A conduit 54 connects the outer end of cylinder 53 with the port 19 of the valve 10 for the movement of the platen 52 toward the platen 51 in a flashing and upsetting direction while a conduit 55 connects the inner end of cylinder 53 with port 21 of the valve 10 for retraction of the slide 52 preparatory to the next succeeding welding operation. A source of hydraulic fluid under pressure is provided by the conduit 56 which is connected to the inlet port 20 of the valve 10 and for reasons to be hereinafter pointed out an accumulator 57 is placed in communication with the conduit 56.

In butt-flash welding apparatus it is highly desirable to control the movement of the movable platen (52) in an automatic manner in accordance with a predetermined time-position pattern particularly during the flashing period and to provide additional automatic means to valve a large quantity of fluid to the platen moving motor (53) upon completion of the flashing action to effect a quick upsetting movement of the movable work pieces and, further, it is also desirable that the machine be constructed in such manner that, if desired, the movement of the platen may be manually controlled particularly at the start of the flashing action. The system disclosed and claimed in the above mentioned application accomplishes these objectives so the following description will be concerned primarily with the adaptation of the valve mechanism of the present invention to a welding machine having the operating characteristics enumerated.

Pivotally connected to the clevis 39 is a link 58 which is pivoted intermediate its ends between the prongs of a clevis 59 which is rigidly carried by the outer end of a rod 60. Clevis 59 is slidably guided between a pair of spaced parallel surfaces 61 formed on the cap member 36 and, as shown, the opposite end of rod 60 is slideably received in a bore in lug 62 formed as an integral part of the cap 29. Encircling the rod 60 and positioned intermediate the lug 62 and the clevis 59 is a compression spring 63 the function of which is to always urge the clevis 59 to the right as viewed in Figure 1. Clevis 59 mounts a cam following roller 64 which engages a cam 65 mounted for slideable movement in a direction generally parallel with the link 58. For operating the cam I provide a cylinder 66 the piston rod of which is connected to the slide mounting the cam 65. A conduit 67 connects the rod end of cylinder 66 with the supply line 56 while a conduit 67, solenoid operated valve 68, metering valve 69, and conduit 70 connects the supply line with the opposite end of cylinder 66. In parallel with metering valve 69, which is adjustable, is a check valve 71 so that upon de-energization of the solenoid 72 which actuates valve 68 fluid from the head end of the cylinder 66 can escape rapidly through valves 71 and 68 to allow for quick retraction of the cam 65 by the inflow of fluid through conduit 67 into the rod end of the cylinder. It should be noted that the difference in effective area on opposite sides of the piston in the cylinder 66 as represented by the area of the rod enables the fluid pressure developed in the head end of the cylinder by the supply of fluid to valves 68 and 69 to overcome the pressure of the fluid in the rod end of the cylinder to allow cam 65 to move at a rate determined by the setting of the valve 69.

Pivotally connected to the end of link 58 on the side of clevis 59 opposite clevis 39 is a link 73 the opposite end of which is pivotally connected to a bellcrank 74 pivotally mounted on a lug 75 formed integral with and extending outwardly from the valve body 10. The other leg of bellcrank 74 is connected with a toggle link 76 having a cooperating toggle link 77 formed as an integral part of a hand lever 78. Lever 78 is rotatably mounted on a bar 79 adjustably carried by the slide 52 as shown. The adjustable mounting of the bar 79 is such that the same may be adjusted longitudinally with respect to the slide or platen 52. Link 76 has an extension or projection on which is mounted switches 80 and 81 for actuation by engagement with a projection 82 formed on the link 11. When the toggle is straight switches 80 and 81 are closed and to releasably hold the toggle in straightened-out position a latch 83 is mounted on the link 76 for cooperation with a lug formed as an integral part of the link 77.

Welding current is supplied to the electrodes carried by the platens 51 and 52 by welding transformer 84, the primary of which is energized from a suitable source through a circuit which may include a control assembly 85 having, in accordance with usual practice, means to initiate the flow of current and means to determine or modulate the strength of current translated, and a normally closed contactor 86 arranged to be opened by a solenoid 87 upon energization thereof. Closure of switch 80 actuates control 85 to initiate the flow of welding current and a second switch 88 for the same purpose may be mounted on the hand grip portion of the lever 78 so that the flow of welding current may be initiated by closure of either switch 80 or 88 and the flow of current continued after straightening and latching of the toggle even if the operator removes his hands from the controls as will be understood. I provide a transformer 89 for furnishing energizing current to the solenoids 45, 72, and 87, the energization of the former being under the control of a switch 90 which is arranged to be closed upon the cam 65 reaching a predetermined adjusted advanced position. Solenoid 72 is arranged to be energized upon closure of switch 81 while solenoid 87 is energized upon the closure of the switch 91 which also is operable upon the cam 65 reaching a predetermined adjusted position.

In operation, the spool 12 of the main valve will normally be in centered or neutral position as shown in Figure 1, this necessarily following from the nature of the valve and from the nature of the linkage interconnecting the spool and the slide 52—assuming that the cam follower 64 is maintained in pressure engagement with the cam 65 by means of the spring 63. At the start of a welding operation cam 65 will be fully retracted and slide 52 will be retracted an extent determined by the extent of shortening (breaking) of the toggle 76, 77 by rotation of the control lever 78 to the right as viewed in Figure 2. Upon breaking of the toggle switches 80 and 81 are, of course, opened so that solenoid 72 is de-energized and, if switch 88 is opened, no welding current flows. With work pieces clamped to the platens 51 and 52 the operator moves the pieces together for pre-heating or for initiating the flashing action by rotation of the lever 78 to the left which lengthens toggle 76, 77 thereby rotating bellcrank 74 thus rotating link 58 about its point of pivotal connection with the clevis 59 and thereby moving spool 12 to the left as viewed in Figure 1 to admit hydraulic fluid under pressure to port 19 and to allow fluid to bleed off from the platen end of cylinder 53 through cut 27 and exhaust port 22. This moves platen 52 in a forward direction and if lever 78 is not further rotated such movement will stop when the distance traversed is comparable proportionately with the extent of rotation of a lever 78, the movement of the platen 52 operating through the linkage including bar 79 to pivot link 58 in the opposite direction to bring the spool 12 back to its initial starting or neutral position. Continued rotation of the lever 78, however, results in continued movement of the platen 52, which continued movement is normally utilized for initiating the flashing action, and upon the toggle becoming straightened and locked valve 68 is opened to admit fluid to the head end of cylinder 66 to initiate the timed movement of cam 65. Thereupon cam 65 moves the clevis 59 inwardly at a rate determined by its pattern such inward movement when translated to the link 58 necessarily results in the forward movement of the platen 52 at a rate also determined by the pattern of the cam. In considering this operation, the link 58 may be thought of as pivoting about its point of interconnection with the link 73 so that if the cam 65 moves the clevis 59 faster than the platen moves the link 73 link 58 will be rotated about such pivot to move spool 12 in a direction tending to supply additional fluid to the head end of the cylinder 53.

Upon completion of sufficient flashing as determined by the cam 65 reaching a predetermined advanced position switch 90 is closed to energize relay 45 thereby admitting fluid pressure to the outer side of piston 40 to rapidly move the spool 12 far to the left as viewed in Figure 1 against the action of the springs 31 and 63. At the end of such movement shoulder 34 of the spool 12 engages the washer 34 which has a limited amount of sliding movement against the action of the spring 31 whereby a cushion stop is provided. In this position of the spool the enlargements 23 and 24 thereof are moved past at least approximately half of the longitudinal extents of the annular recesses 14 and 16 so that a large volume of fluid may be quickly transferred from inlet port 20 to the port 19 and thus in the conduit 54 while a correspondingly large volume of fluid may be as quickly exhausted through conduit 55, port 21, and exhaust port 22. This provides for the quick upsetting movement of the movable platen as is required in the operation of flash-butt welding machines.

In practice, the location of switch 90 and/or its operator mounted on the slide 65 may be readily shifted or adjusted to determine the exact point on the range of movement on the slide at which upset will occur. Thus, upset may take place after either little or prolonged flashing. Similarly the location of switch 91 and/or its operator on the slide 65 may be shifted or adjusted to cut off the flow of welding current either before, during or after the upsetting of the work. In order to prevent gripping of the movable platen 52 when the control lever 78 is at rest in any broken toggle position I provide a small bleeder hole 92 which interconnects ports 19 and 21. The final or minimum interval between the dies carried by platens 51 and 52 is determined by the adjustment of a nut 93 on the rod mounting the piston within cylinder 53 and, therefore, the adjusted position of the bar 79 with respect to the platen 52 determines the extent of movement of the platen 52 during the upsetting of the work, it being observed that the previous adjustment of the position of the switch 90 or its operator determined the position which bar 79 would reach at the initiation of upset. By adjusting the position of the bar 79 forwardly with respect to the platen 52 greater movement of the platen 52 will be attained during the upsetting period.

At the completion of a cycle of operation the flow of welding current is cut off by energization of solenoid 86 and upon unclamping of the work lever 78 is rotated to the right thereby opening switches 80 and 81 which prevents the reapplication of welding current upon retraction of the slide 65 and which de-energizes solenoid 72 thereby actuating cylinder 66 in a reverse direction causing retraction of the slide 65. As the slide 65 begins to retract the opening of switch 90 de-energizes solenoid 45 thereby allowing valve 41 to reset and the springs 31 and 63 to move the cam follower 64 back into engagement with the cam. Thereafter, the shortening of the toggle 76, 77 rotates link 58 about its point of connection with clevis 59 in such direction as to move spool 12 to the right, as viewed in Figure 1, of its neutral position to reverse the flow of fluid through the cylinder 53. This action retracts the platen 52 at a rate determined by the rate of movement of the control lever 78. Upon the platen 52 being fully retracted the machine is reconditioned for the next succeeding welding operation.

It should now be apparent that I have provided an improved valve mechanism which accomplishes the objects initially set out. First, by the provision of a relatively simple valve of the follow-up type I am enabled to effect smooth and accurate movement of a machine element or slide in response and in accordance with movement of a control member which may be either manually or automatically actuated or actuated by a combination of these two means. Secondly, the same valve mechanism may be employed, as desired, to effect a sudden acceleration of the machine element or slide at a predetermined point in the cycle of operation. These objectives are accomplished, moreover, by a valve mechanism the specific design of which lends itself readily to economic production.

The above specifically described embodiment of the invention should be considered illustrative only as obviously many changes may be made therein without departing from the spirit or scope of the invention. Reference should therefore be had to the appended claims in determining the scope of the invention.

What I claim is:

1. Apparatus for controlling the movement of a device actuated by a hydraulic fluid motor comprising in combination a valve for controlling the flow of actuating fluid to said motor, said valve having a movable control member, a cam, differential linkage means between said cam and member operative to move said member in incremental progression in one direction during forward movement of said cam, and means interconnecting said device and said linkage means and being operative to move said member in the opposite direction in accordance with forward movement of said device whereby said valve controls the flow of fluid to said motor in such manner that the pattern of movement of said device follows accurately the pattern of said cam, said interconnecting means including a manually operable control lever for varying the effective length of said interconnecting means whereby said device may be actuated independently of movement of said cam and in advance of its movement resulting from movement of said cam.

2. Apparatus for controlling the movement of a device actuated by a hydraulic fluid motor comprising in combination a valve for controlling the flow of actuating fluid to said motor, said valve having a movable control member, a cam, differential linkage means between said cam and member operative to move said member in incremental progression in one direction during forward movement of said cam, means interconnecting said device and said linkage means to move said member in the opposite direction in accordance with forward movement of said device, means to move said cam in a forward direction, said interconnecting means including a manually operable control lever for varying the effective length of said interconnecting means whereby said device may be actuated independently of movement of said cam, and means operable upon said lever reaching a predetermined manually advanced position to initiate operation of said cam moving means.

3. Apparatus for controlling the driving movement of a hydraulic fluid motor having a double-ended cylinder and a piston comprising in combination a four-way valve for controlling the flow of hydraulic fluid to and from opposite ends of said cylinder, said valve having a movable control member operative in one direction of its movement to uncover the port leading to the driving end of said cylinder at a faster rate than the port leading from the tail end of the cylinder, a cam, differential linkage means between said cam and member to move said member in said direction during forward movement of said cam, and means interconnecting the driven element of said motor and said linkage means to move said member in the opposite direction in accordance with the forward movement of said driven element, said interconnecting means including a manually operable control lever for varying the effective length of said interconnecting means whereby said driven element may be actuated independently of movement of said cam and in advance of its movement resulting from movement of said cam.

4. Apparatus for controlling the movement of a device actuated by a hydraulic fluid motor comprising in combination a valve for controlling the flow of actuating fluid to said motor, said valve having relatively movable elements which are operable within an initial limited range of relative movement to modulate the flow of hydraulic fluid to said motor but which in a further sequential range of relative movement are operative to rapidly valve a large volume of fluid to said motor; and means for effecting relative movement of said elements over said first mentioned range comprising in combination a cam, differential linkage means between said cam and one of said elements and operative to move said one of said elements in incremental progression in one direction during forward movement of said cam, and means interconnecting said device and said linkage means and being operative to move said one of said elements in the opposite direction in accordance with the movement of said device, a manually operable control lever forming a part of said interconnecting means for varying the effective length of said interconnecting means whereby said device may be actuated independently of movement of said cam, and means operable upon said device reaching a predetermined advanced position to initiate effective movement of said cam.

CLYDE E. COATES.

REFERENCES CITED

The following references are of record in the file of this patent:

UNITED STATES PATENTS

| Number | Name | Date |
|---|---|---|
| 745,520 | Prescott | Dec. 1, 1903 |
| 930,225 | Ragonnet | Aug. 3, 1909 |
| 1,075,733 | Simon | Oct. 14, 1913 |
| 1,563,988 | Howse | Dec. 1, 1925 |
| 2,055,530 | Hallenbeck | Sept. 29, 1936 |
| 2,209,418 | Overbeke | July 30, 1940 |
| 2,299,430 | Sexton | Oct. 20, 1942 |
| 2,411,270 | Hart | Nov. 19, 1946 |

FOREIGN PATENTS

| Number | Country | Date |
|---|---|---|
| 29,056 | Great Britain | of 1909 |
| 401,937 | France | Apr. 10, 1909 |